April 19, 1927.
H. J. CORSON
TRAP
Filed June 11, 1926
1,625,710
2 Sheets-Sheet 1
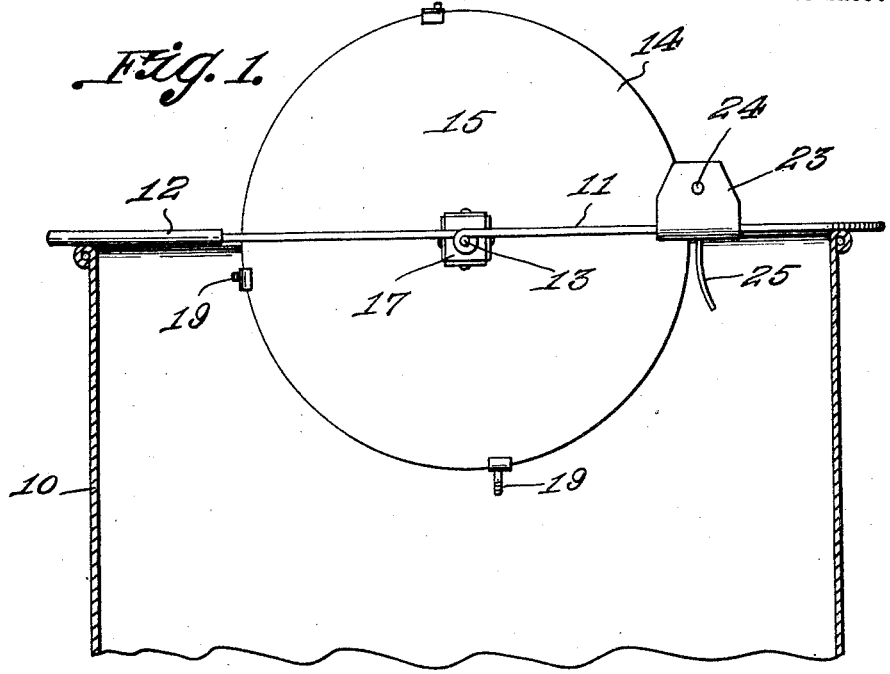
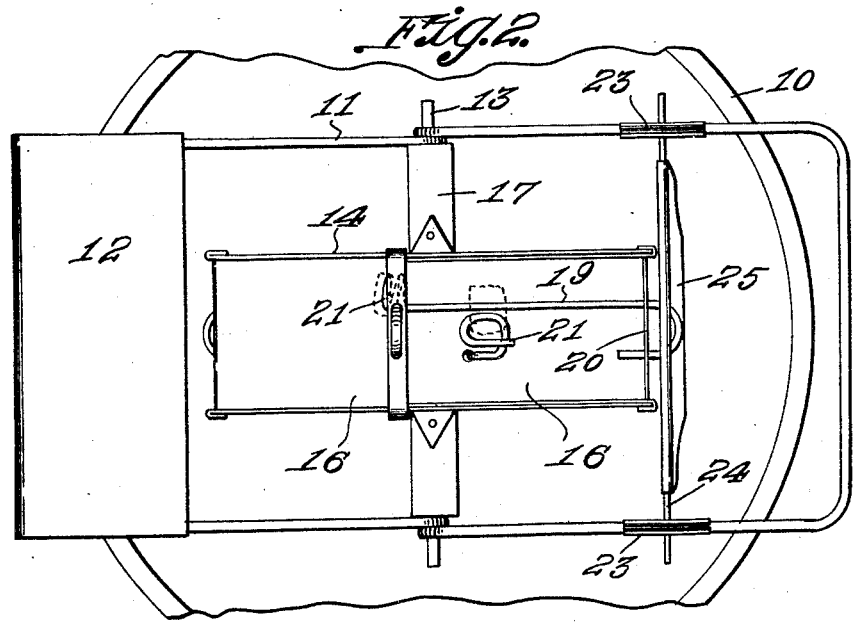
Henry J. Corson, INVENTOR
BY Victor J. Evans ATTORNEY
WITNESS:

April 19, 1927.  1,625,710
H. J. CORSON
TRAP
Filed June 11, 1926  2 Sheets-Sheet 2
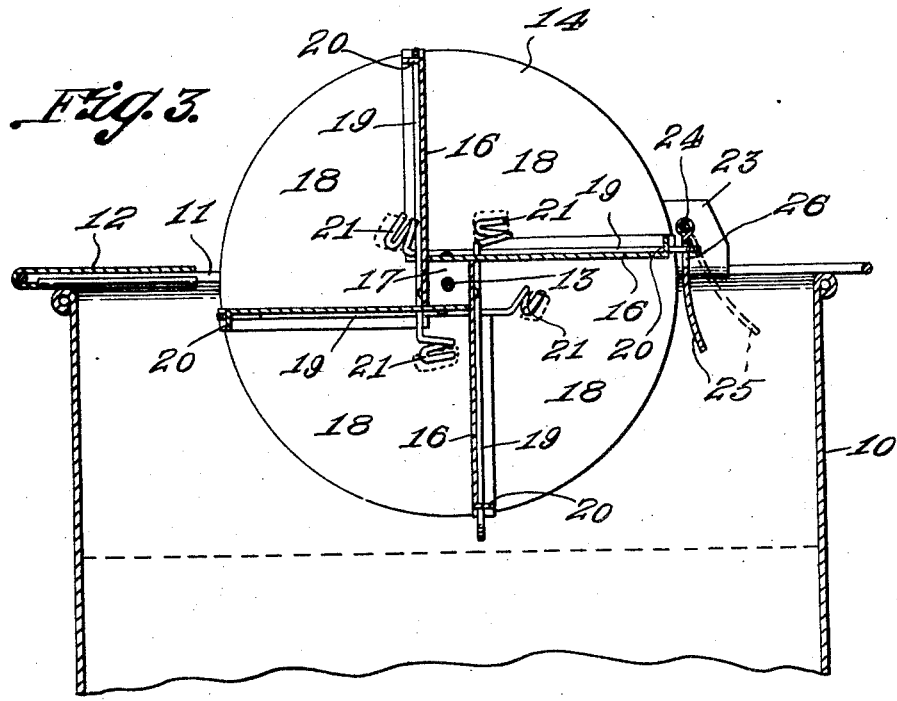
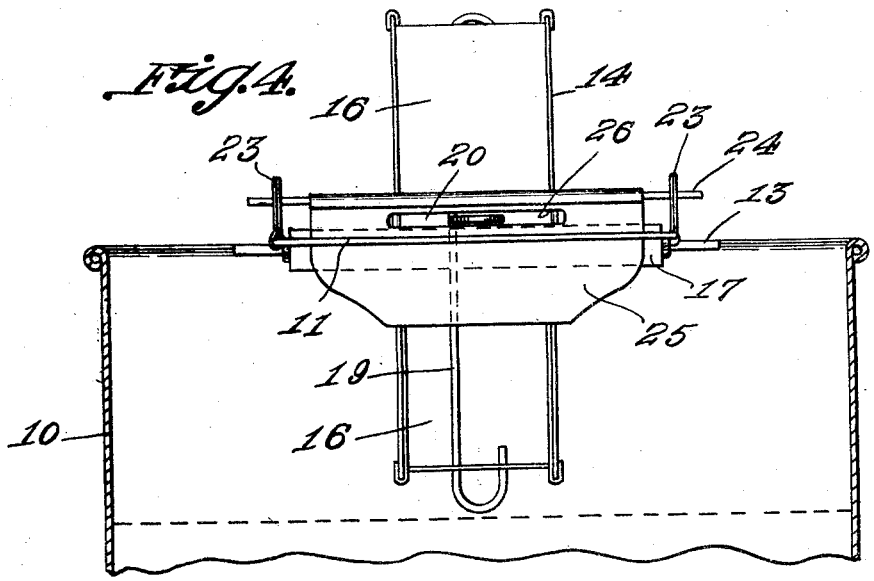
Henry J. Corson,
INVENTOR
BY Victor J. Evans
ATTORNEY Patented Apr. 19, 1927.

1,625,710

UNITED STATES PATENT OFFICE.

HENRY J. CORSON, OF ORVILLE, WASHINGTON, ASSIGNOR OF ONE-HALF TO WILLIAM H. COMKLE, OF ORVILLE, WASHINGTON.

TRAP.

Application filed June 11, 1926. Serial No. 115,316.

The invention relates to animal traps and is especially designed for catching rats and other rodents, but, may be arranged for catching other animals.

An object of the present invention is the provision of a trap which may be operated a number of times to capture a number of animals, without being manually reset, the construction providing a novel form and arrangement of bait compartments and novel and automatic means for holding the trap in operative position.

With the above and other objects in view, the invention further includes the following novel features and details of construction, to be hereinafter more fully described, illustrated in the accompanying drawings and pointed out in the appended claims.

In the drawings:—

Figure 1 is an elevation of the invention with the container in section.

Figure 2 is a fragmentary top plan view.

Figure 3 is a vertical sectional view.

Figure 4 is a sectional elevation at right angles to Figure 1.

Referring to the drawings in detail wherein like characters of reference denote corresponding parts, the trap as shown comprises a container 10 which may be of any suitable character. A bucket or pail may be used for this purpose if desired.

Mounted upon the top of the container is a frame 11 which includes a platform 12, while rotatably mounted within this frame is a shaft 13 which supports a rotor 14, the latter being arranged adjacent the platform 12.

The rotor 14 comprises spaced preferably circular side walls 15 and outwardly extending platforms 16 which connect the side walls 15 and which extend from a hub 17. A plurality of bait compartments 18 is thus provided.

Extending longitudinally of the platform 16 of each bait compartment 18, is a rod 19. The outer ends of these rods are reversely bent and operate through openings provided in a flange 20 at the outer extremities of the platforms 16. The inner ends of the rods 19 are shaped to provide bait holders 21 which are adapted to contain a bait or lure as shown by the dotted lines in Figures 2 and 3 of the drawings..

Pivotally mounted between upstanding ears 23 which are carried by the frame 10, is a shaft 24 and mounted upon this shaft is a plate or wing 25 which is provided with an opening 26 extending longitudinally thereof. This plate is transversely curved as shown in Figure 3 of the drawings and is arranged in the path of the outer ends of the rods 19 when the latter are extended.

Normally, the rods are baited and moved longitudinally outward, one of the rods entering the opening 26 in the plate 25 so that the rotor 14 will be held stationary. An animal entering the compartment 18 remote from the plate 25 will pull upon the plate engaged rod 19 in its attempt to obtain the bait. This will disengage the rod from the plate 25, whereupon the weight of the animal will cause the rotor to operate and precipitate the animal into the container. The holder may contain water or other liquid to kill the animal.

The rotor will make one quarter revolution, at which time the next extended rod 19 will engage the plate 25 and the latter will be moved pivotally as indicated by the dotted lines in Figure 3 so as to permit the extended end of the rod to enter the opening 26 and again hold the rotor stationary.

The invention is susceptible of various changes in its form, proportions and minor details of construction, and the right is herein reserved to make such changes as properly fall within the scope of the appended claims.

Having described the invention what is claimed is:—

1. An animal trap comprising a container, a stationary platform thereon, a rotor at the inner end of the platform, said rotor including spaced side walls, circumferentially spaced platforms extending outwardly from a point substantially central of the rotor and providing together with the side walls, separate compartments, a trigger movable longitudinally of each compartment and adapted to extend beyond the outer end thereof, a pivotally mounted plate arranged in the path of the extended end of the trigger and having an opening therein to receive said trigger and hold the latter against movement and a bait holder at the inner end of the trigger, whereby an animal may pull the trigger longitudinally to release the rotor.

2. In an animal trap, a frame adapted to be positioned upon the top of a container, said frame including parallel side bars and an end bar connecting the side bars, oppositely located eyes in the side bars, a shaft journaled in said eyes, a rotor carried by the shaft, spaced platforms extending outwardly from the shaft, a trigger carried by each platform, means carried by the frame for engagement by the trigger, means at the inner end of each trigger to provide a bait holder, whereby an animal may release the trigger and a platform at one end of the frame.

In testimony whereof I affix my signature.

HENRY J. CORSON.